US009259760B2

(12) United States Patent
Lee et al.

(10) Patent No.: US 9,259,760 B2
(45) Date of Patent: Feb. 16, 2016

(54) METHOD FOR COATING OXIDATION PROTECTIVE LAYER FOR CARBON/CARBON COMPOSITE, CARBON HEATER, AND COOKER

(75) Inventors: Youngjun Lee, Seoul (KR); Kabseung Yang, Seoul (KR); Jeonghyun Yoon, Seoul (KR); Changhyo Kim, Seoul (KR); Sooyeon Kim, Seoul (KR); Seongho Cho, Seoul (KR); Bohye Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 638 days.

(21) Appl. No.: 13/638,670

(22) PCT Filed: Mar. 31, 2011

(86) PCT No.: PCT/KR2011/002251
§ 371 (c)(1),
(2), (4) Date: Dec. 11, 2012

(87) PCT Pub. No.: WO2011/122890
PCT Pub. Date: Oct. 6, 2011

(65) Prior Publication Data
US 2013/0075387 A1 Mar. 28, 2013

(30) Foreign Application Priority Data

Mar. 31, 2010 (KR) .................. 10-2010-0029535

(51) Int. Cl.
*B05D 3/02* (2006.01)
*H05B 3/03* (2006.01)
(Continued)

(52) U.S. Cl.
CPC .......... *B05D 3/0209* (2013.01); *C04B 35/6263* (2013.01); *C04B 35/6264* (2013.01); *C04B 35/6286* (2013.01); *C04B 35/62863* (2013.01); *C04B 35/62871* (2013.01);
(Continued)

(58) Field of Classification Search
None
See application file for complete search history.

(56) References Cited

U.S. PATENT DOCUMENTS 4,726,099 A * 2/1988 Card ................. H01L 41/37
252/62.9 R
4,833,030 A 5/1989 Petersen ................. 428/408
(Continued)

FOREIGN PATENT DOCUMENTS

EP 1 481 954 A1 12/2004
EP 1 622 423 A1 2/2006
(Continued)

OTHER PUBLICATIONS

Saufi, S.M. et al.; "Fabrication of Carbon Membranes for Gas Separation—A Review"; Carbon; Oxford, Great Britain; vol. 42, No. 2; Jan. 1, 2004; pp. 241-259 (XP-004483335).
(Continued)

*Primary Examiner* — Joseph M Pelham
(74) *Attorney, Agent, or Firm* — Ked & Associates, LLP

(57) ABSTRACT

The present invention provides an oven range. In the present invention, a method for coating an oxidation protective layer for a carbon/carbon composite, comprising: dissolving a polymer resin in a solvent to form a solution of polymer resin; dispersing ceramic powders in the solution of polymer resin to form a mixed solution; coating the mixed solution on a carbon fiber; performing a first heat-treatment to treat the carbon fiber by heat in air; and performing a second heat-treatment to treat the carbon fiber by heat under an inert gas.

16 Claims, 4 Drawing Sheets

(51) Int. Cl.
   *C04B 41/00* (2006.01)
   *C04B 41/50* (2006.01)
   *C04B 41/87* (2006.01)
   *H05B 3/14* (2006.01)
   *C04B 35/628* (2006.01)
   *C04B 35/83* (2006.01)
   *C04B 35/626* (2006.01)
   *C04B 35/634* (2006.01)

(52) U.S. Cl.
   CPC .... *C04B 35/62886* (2013.01); *C04B 35/62889* (2013.01); *C04B 35/62892* (2013.01); *C04B 35/63416* (2013.01); *C04B 35/63444* (2013.01); *C04B 35/83* (2013.01); *C04B 41/009* (2013.01); *C04B 41/5059* (2013.01); *C04B 41/5061* (2013.01); *C04B 41/5066* (2013.01); *C04B 41/87* (2013.01); *H05B 3/03* (2013.01); *H05B 3/145* (2013.01); *C04B 2235/528* (2013.01); *C04B 2235/5248* (2013.01); *C04B 2235/5445* (2013.01); *C04B 2235/9684* (2013.01)

(56) References Cited

U.S. PATENT DOCUMENTS

| | | | | |
|---|---|---|---|---|
| 5,190,654 | A | 3/1993 | Bauer | 210/490 |
| 5,562,966 | A | 10/1996 | Clarke et al. | 428/113 |
| 5,692,291 | A * | 12/1997 | Deevi et al. | 29/611 |
| 5,716,677 | A * | 2/1998 | Mazany | C08G 73/1007 427/377 |
| 6,057,532 | A * | 5/2000 | Dexter et al. | 219/553 |
| 6,165,551 | A * | 12/2000 | Lukacs, III | C03C 17/007 427/228 |
| 9,102,570 | B2 * | 8/2015 | Joo | D01D 5/0069 |
| 2004/0245904 | A1 | 12/2004 | Kitamura et al. | 313/310 |
| 2005/0142346 | A1 * | 6/2005 | Ohnishi et al. | 428/292.1 |
| 2006/0032847 | A1 * | 2/2006 | Kim et al. | 219/553 |
| 2010/0068485 | A1 * | 3/2010 | Ounaies | B32B 27/20 428/212 |
| 2010/0084394 | A1 * | 4/2010 | Konishi et al. | 219/534 |
| 2011/0278283 | A1 * | 11/2011 | Park | 219/548 |
| 2013/0087552 | A1 * | 4/2013 | Lee et al. | 219/553 |
| 2015/0030856 | A1 * | 1/2015 | Singh | B82Y 30/00 428/408 |

FOREIGN PATENT DOCUMENTS

| | | |
|---|---|---|
| KR | 10-2006-0092741 A | 8/2006 |
| KR | 10-2007-0024967 A | 3/2007 |
| WO | WO 2008/082883 A1 | 7/2008 |

OTHER PUBLICATIONS

European Search Report dated Sep. 13, 2013 issued in Application No. 11 76 3062.
European Office Action dated May 7, 2014 issued in Application No. 11 763 062.4.
International Search Report dated Dec. 20, 2011 issued in Application No. PCT/KR2011/002251.

\* cited by examiner

METHOD FOR COATING OXIDATION PROTECTIVE LAYER FOR CARBON/CARBON COMPOSITE, CARBON HEATER, AND COOKER

CROSS-REFERENCE TO RELATED PATENT APPLICATIONS

This application is a U.S. National Stage Application under 35 U.S.C. §371 of PCT Application No. PCT/KR2011/002251, filed Mar. 31, 2011, which claims priority to Korean Patent Application No. 10-2010-0029535, filed Mar. 31, 2010.

TECHNICAL FIELD

The present disclosure relates to a carbon/carbon composite, and more particularly, to a method for coating an oxidation protective layer for the carbon/carbon composite, and a carbon heater prepared thereby and a cooker having the carbon heater.

BACKGROUND ART

Carbon fibers (CFs) are materials comprising 92% or more carbon, and having high values in thermal conductivity, specific strength and elasticity, and low values in modulus of elasticity, coefficient of thermal expansion and density. Also, carbon fibers are materials suitable for use in a high temperature structure by virtue of relatively good processability, and in particular, interest in carbon fibers as a reinforcing material for high-tech composites having high processability is increasing. In addition, carbon fibers are highly resistant to thermal shock, and thus have been widely used in various industry fields as materials for an ultra-high temperature structure such as friction materials for aircrafts, nose cones for space shuttles, heat resistant materials for nuclear reactors and nozzles for rockets, which take a great of heat in a very short time.

However, although carbon fibers (CFs) have favorable engineering properties, a surface of carbon fiber are oxidized by reacting with oxygen when exposed to air at a temperature of 500° C. or more, or gases such as CO or $CO_2$ are generated, resulting in an erosion (ablation) of material. Thus, pure carbon fibers are not suitable for use in these applications. That is, as shown in FIG. 1, when carbon fibers are treated by heat (1000° C.) in air, pores are formed on a surface of carbon fiber by CO or $CO_2$ are generated, resulting in an erosion (ablation) of material. Thus, pure carbon fibers are not suitable for use in these applications. That is, as shown in FIG. 1, when carbon fibers are treated by heat (1000° C.) in air, pores are formed on a surface of carbon fiber by CO or $CO_2$ which are oxidized by reacting with oxygen at a high temperature. Further, a decrease in weight and strength of carbon fibers thereby may limit their applications. Then, when a carbon fiber having unstable surface is exposed to an ultra-high temperature of 2000° C. or more, portions attenuated due to oxidation are cut off by thermal conduction, which is called 'ablation'. Therefore, the surface and structure of carbon fiber as well as intrinsic properties thereof should be protected in an oxygen atmosphere.

As described above, to use carbon fibers at a high temperature, they have to be separated from an oxygen atmosphere to prevent oxidation from being generated. Therefore, to prevent the oxidation of carbon fibers (CFs) at a high temperature and improve heat and ablation resistances thereof, it is very important to ensure a technology for making a composite with carbon fibers.

Generally, there are two approaches to prevent carbon fibers from being oxidized and improve heat and ablation resistances thereof. One approach is a method of adding an oxidation inhibitor to carbon, and the other approach is a method of coating an oxygen-impermeable layer on a surface of carbon fiber. The former can inhibit oxidation at up to about 1000° C. but this method has a disadvantage that an effect of inhibiting oxidation is greatly lowered at a high temperature of 1000° C. or more. Therefore, it may be necessary to form a coating layer to prevent carbon fibers from being oxidized at a high temperature of 1000° C. or more.

Generally, as methods for coating an oxidation protective layer for a carbon fiber, when a temperature in use is about 1000° C. or less, a cheap phosphoric acid-based coating layer is used. When a temperature in use is about 1000° C. or more, boron-based coating layer is used. However, the use of boron is limited due to a high equilibrium vapor pressure of boron at a high temperature of 1500° C. or more.

Therefore, to solve this problem, at a temperature of 1500° C. or more, the oxidation of carbon fiber is inhibited by forming an amorphous $SiO_2$ layer having a low oxygen transmittance rate on a surface of carbon fiber.

U.S. Patent Application Publication No. 2004/0258839 relates to "a method for forming an oxidation protective coating layer to impart oxidation resistance to a carbon/carbon composite". The above-mentioned patent discloses a method of forming two or more oxidation protective coating layer by impregnating only Si on a carbon/carbon composite using a pack cementation technology, and in particular, a composite coating method capable of controlling the thickness of coating layer by 10 μm to 2,000 μm. However, this method fails to achieve a satisfactory effect in terms of a coating process or fire resistance. Further, the method has a disadvantage that a chemical vapor reaction is used in coating ceramics, and thus a process is complicated and expense.

DISCLOSURE OF INVENTION

Technical Problem

Embodiments provide a method for coating an oxidation protective layer for a carbon/carbon composite having good oxidation resistance, by preventing carbon fibers from being oxidized at a high temperature and improving heat and ablation resistances thereof.

Solution to Problem

An exemplary embodiment of the present invention provides a method for coating an oxidation protective layer for a carbon/carbon composite, comprising: dissolving a polymer resin in a solvent to form a solution of polymer resin; dispersing ceramic powders in the solution of polymer resin to form a mixed solution; coating the mixed solution on a carbon fiber; performing a first heat-treatment to treat the carbon fiber by heat in air; and performing a second heat-treatment to treat the carbon fiber by heat under an inert gas.

Another exemplary embodiment of the present invention provides a carbon heater comprising: a filament formed of a carbon or carbon composite coated with an oxidation protective layer by a method of any one of claims 1 to 11; and terminals connected to both ends of the filament, which supply power to the filament.

Yet exemplary embodiment of the present invention provides a cooker comprising: a cavity having a cooking chamber; a carbon heater of claim 12 for supplying energy to cook foods within the cooking chamber; and a door to open and close selectively the cooking chamber.

Advantageous Effects of Invention

According to an embodiment, the oxidation of carbon fibers is prevented at a high temperature in air, and thus heat and ablation resistances of a carbon fiber composite are improved. Thus, the carbon fiber composite may have high thermal stability and oxidation resistance when it is in air.

Also, according to an embodiment, the carbon fiber composite may have a uniform coating layer. Therefore, a peeling of the coating layer which may be generated due to a difference in coefficient of thermal expansion between the coating layer and the surface of carbon fiber under iterative thermal history may be prevented.

Furthermore, according to an embodiment, an adhesive force between the carbon fiber and the coating layer is increased. Therefore, a peeling of the coating layer from the carbon fiber due to an external physical force may be prevented.

In addition, according to an embodiment, the particle size of ceramic particles being coated on the surface of carbon fiber may be adjusted depending on various factors such as coating time, variation in concentrations of polymer resin and ceramic powder, or heat-treatment temperature. Therefore, the thickness of coating layer may be controlled, and coating layers having different thicknesses may be formed on the surface of carbon fiber.

BEST MODE FOR CARRYING OUT THE INVENTION

Hereinafter, a method for coating an oxidation protective layer for a carbon/carbon composite according to the present invention will be described in detail with reference to the accompanying drawings and embodiments.

Figure 1:
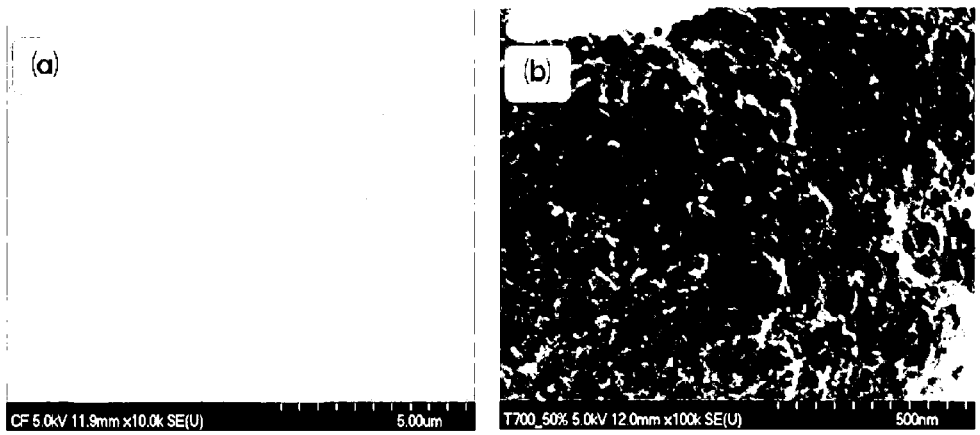
FIG. 1A is a high-magnification scanning electron microscope (SEM) photograph of carbon fiber.
FIG. 1B is a high-magnification scanning electron microscope (SEM) photograph of carbon fiber after a heat-treatment at 1000° C. in air.
Figure 2:
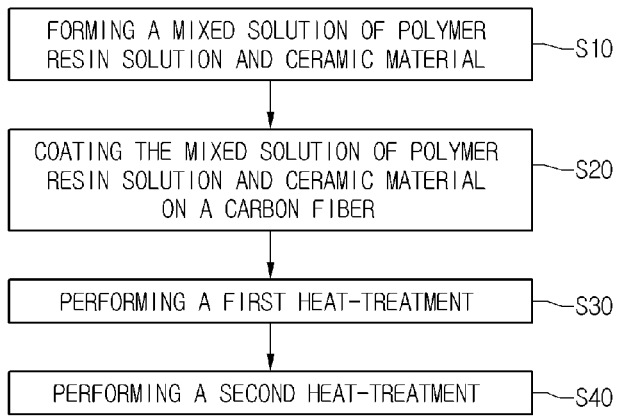
FIG. 2 is a flow chart showing processes for manufacturing a carbon fiber composite coated with a mixed solution comprising ceramic powders according to an embodiment.

FIG. 2 is a flow chart showing processes for manufacturing a carbon fiber composite coated with a mixed solution comprising ceramic powders according to the present invention.

Regarding FIG. 2, first, a polymer resin is dissolved in a solvent to form a solution of polymer resin, and ceramic powders are dispersed and mixed with the solution of polymer resin (S10). Thus, ceramics having a relatively low adhesive force to carbon fibers may be stably deposited on the surface of carbon fiber.

That is, in the case of carbon fibers formed at a high temperature, the number of functional groups on the surface of carbon fiber which can enhance a bonding force to a matrix is relatively less, and thus an adhesive force to ceramics become very weak. Therefore, the following polymer resins may be introduced into carbon fibers to improve a bonding property of surface of carbon fiber and impart ablation and corrosion resistances to the surface such that the functionality of carbon fibers is improved.

The polymer resin may be selected from the group consisting of polyacrylonitriles, polyimides, polybenzimidazoles (PBIs), and polyvinylalcohols (PVAs). The polymer resin may be preferably polyacrylonitriles.

Among the above-mentioned polymer resins, polyacrylonitriles (PANs, molecular weight=160,000), including 100% pure homopolymers and modified-acryls containing 5 to 15 wt % copolymers may be used. As components of the copolymers, copolymer materials such as itaconic acid or methylacrylate (MA) may be used.

The polymer resins thus may improve a bonding property of surface of carbon fiber. Thus, the above-mentioned polymer resins may improve an adhesive force of carbon fiber to ceramics, and ablation and corrosion resistances of surface of carbon fiber.

The solvent in which the polymer resins are dissolved may be selected from the group consisting of tetrahydrofuran (THF), dimethylformamide (DMF), dimethylacetamide (DMAc), pyridine, quinoline, and water ($H_2O$). In the solution of polymer resin comprising the polymer resin dissolved in the solvent, the polymer resin may be present at the ratio of 5 to 10 wt %.

The ceramic material may be a non-oxidative ceramic material having a high melting point, good toughness, and good oxidation and ablation resistances. The ceramic material may be silicon carbide (SiC), silicon nitride (Si3N4), or titanium carbide (TiC), and preferably may be SiC.

The ceramic material may be dispersed at the ratio of 1:0.5 to 1:2 by weight with respect to the polymer resin, preferably at the ratio of 1:0.8 to 1:1.3 with respect to the polymer resin, and more preferably at the ratio of 1:1 with respect to the polymer resin. Thus, according to an embodiment, ceramic powders may be uniformly coated on the surface of carbon fiber when the ratio of the polymer resin to the ceramic powder is 1:1 by weight.

In Step 10, the solution of polymer resin and the ceramic material may be mixed using a stirrer, rod, and the like such that the ceramic material is uniformly mixed with the solution of polymer resin. That is, various methods to disperse ceramic powders evenly in the solution of polymer resin may be used.

Next, the mixed solution of polymer resin and ceramic material is coated on the surface of carbon fiber (S20). The mixed solution of polymer resin and ceramic material may be coated on the surface of carbon fiber using coating methods such as brush coating or roll coating. Also, the mixed solution may be coated on the surface of carbon fiber using a dip coater.

According to an embodiment, in Step 20, the mixed solution of polymer resin and ceramic material may be coated 7 to 12 times using a brush on the surface of carbon fiber. The mixed solution of polymer resin and ceramic material may be coated preferably about 10 times using a brush on the surface of carbon fiber. If the mixed solution is coated too less times on the surface of carbon fiber, it is difficult to achieve a uniform coating entirely between carbon fibers. To the contrary, if the mixed solution is coated too much times, ceramic powders are aggregated to form an uneven coating. Thus, it is most proper to coat the solution as the number of times set forth above.

The coating thickness and particle size of ceramic material coated on the surface of carbon fiber may be varied depending on various factors such as coating time, variation in concentration of polymer resin and ceramic powder or heat-treatment temperature indicated below.

In case of forming a coating layer by vapor deposition of ceramic materials having different coefficients of thermal expansion on the surface of carbon fiber, a peeling of the coating layer may be generated by iterative thermal history due to a difference in coefficient of thermal expansion between the coating layer and the surface of substrate. However, according to an embodiment, as described above, the mixed solution of polymer resin and ceramic material is coated on the surface of carbon fiber, and thus the peeling of coating layer by thermal history may be prevented.

After the completion of Step 20, for a carbon fiber having the coating layer formed, a first heat-treatment is performed in air (S30). Then, after the completion of Step 30, the carbon fiber subjected to the first heat-treatment is subjected to a second heat-treatment under an inert gas to form a carbon fiber composite (S40).

Steps 30 and 40 are steps for oxidation stabilization to increase thermal stability of polymer resin. To this end, Step 30 may be performed at the temperature of 200° C. to 400° C., and more preferably at the temperature of 200° C. to 300° C. Also, Step 30 may be performed for 30 minutes to 2 hours, and preferably 30 minutes to 1 hour. Step 40 may be performed at the temperature of 1000° C. to 1600° C., and preferably at the temperature of 1000° C. to 1400° C. Also, Step 40 may be performed for 30 minutes to 2 hours, and preferably 30 minutes to 1 hour. Furthermore, argon gas may be used as an inert gas in Step 40.

Hereinafter, examples according to an embodiment will be described in detail with reference to the accompanying drawings. However, these examples should be intended to limit the scope of the present invention.

Figure 3:
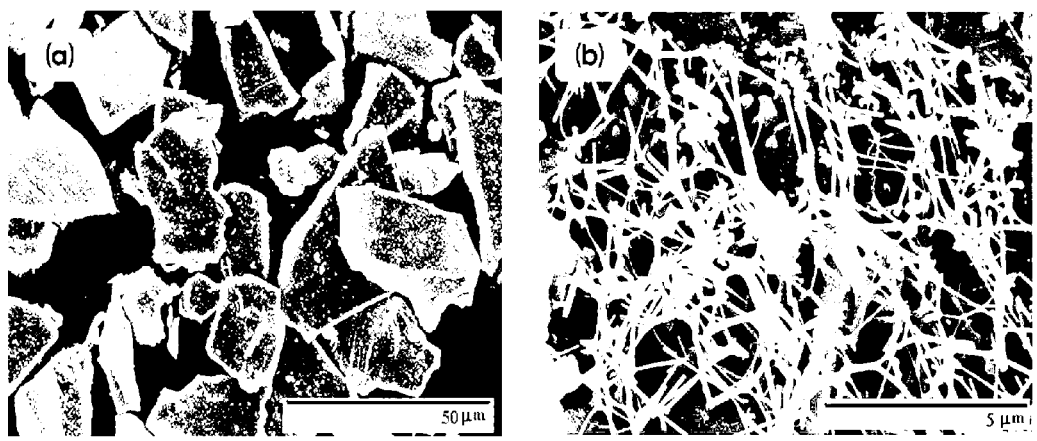
FIG. 3A is a high-magnification scanning electron microscope (SEM) photograph of SiC.
FIG. 3B is a high-magnification scanning electron microscope (SEM) photograph of SiC after a heat-treatment at 1400° C. under argon gas.
Figure 4:
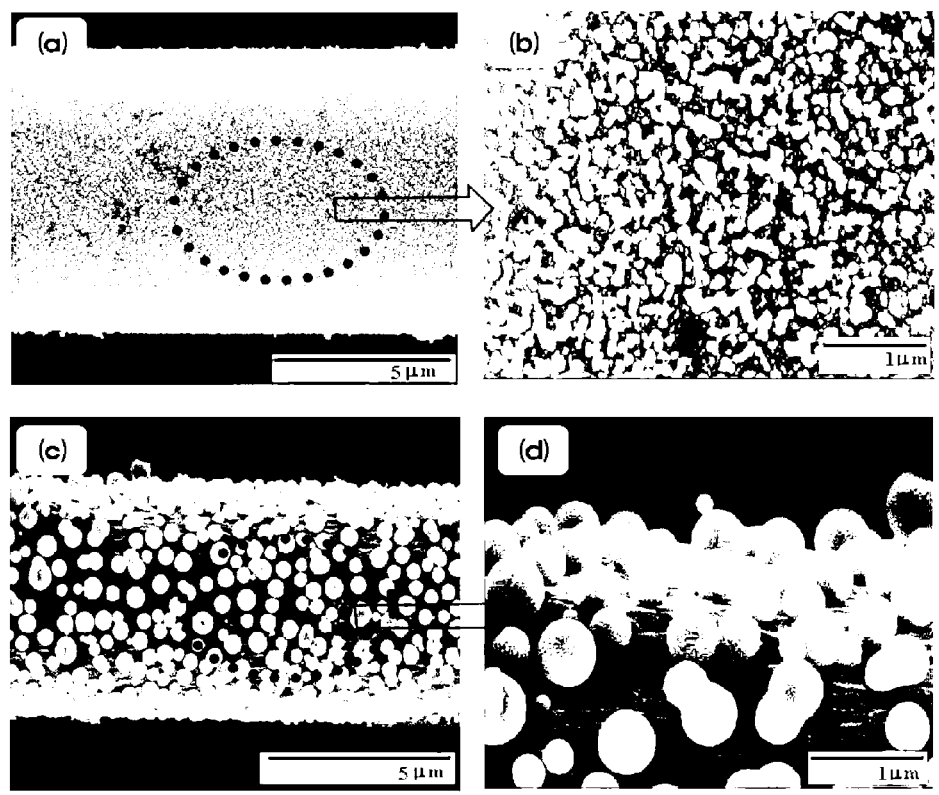
FIGS. 4A and 4B are high-magnification scanning electron microscope (SEM) photographs of a carbon fiber composite coated with a mixed solution of 5 wt % polyacrylonitrile (PAN) solution and SiC (silicon carbide).
FIGS. 4C and 4D are high-magnification scanning electron microscope (SEM) photographs of a carbon fiber composite coated with a mixed solution of 7 wt % polyacrylonitrile (PAN) solution and SiC (silicon carbide).
Figure 5:
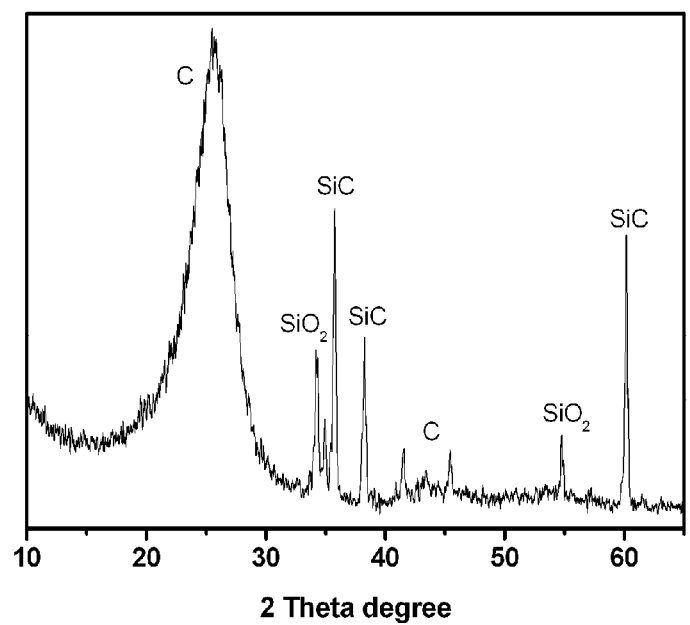
FIG. 5 is a graph of X-ray diffraction (XRD) analysis of a carbon fiber composite coated with SiC according to an embodiment.
Figure 6:
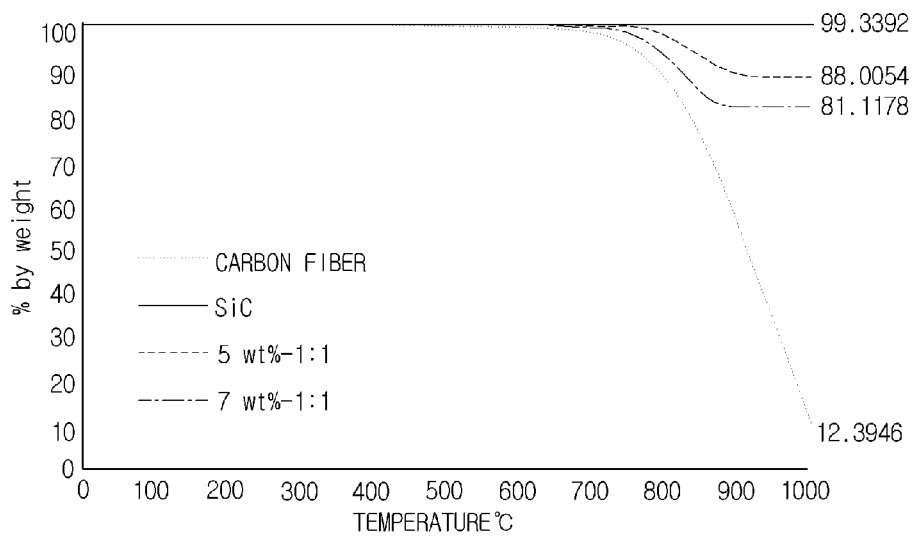
FIG. 6 is a graph of thermo-gravimetric analysis (TGA) of a carbon fiber composite according to an embodiment.

FIG. 3A is a high-magnification scanning electron microscope (SEM) photograph of SiC; FIG. 3B is a high-magnification scanning electron microscope (SEM) photograph of SiC after a heat-treatment at 1400° C. under argon gas; FIGS. 4A and 4B are high-magnification scanning electron microscope (SEM) photographs of a carbon fiber composite coated with a mixed solution of 5 wt % polyacrylonitrile (PAN) solution and SiC (silicon carbide); FIG. 4C is a high-magnification scanning electron microscope (SEM) photograph of a carbon fiber composite coated with a mixed solution of 7 wt % polyacrylonitrile (PAN) solution and SiC (silicon carbide); FIG. 5 is a graph of X-ray diffraction (XRD) analysis of a carbon fiber composite coated with SiC according to an embodiment; and FIG. 6 is a graph of thermo-gravimetric analysis (TGA) of a carbon fiber composite according to an embodiment.

Step 10: Mixing of Polymer Resin and Ceramic Material 25 mL of a polymer resin solution was prepared by dissolving 1.25 g of polyacrylonitrile in 23.75 mL of DMF as a solvent. A 5 wt % mixed solution was prepared by mixing 2 mL of the polymer resin solution and 2 g of SiC powders.

Separately, 25 mL of a polymer resin solution was prepared by dissolving 1.75 g of polyacrylonitrile in 23.75 mL of DMF as a solvent. A 7 wt % mixed solution was prepared by mixing 2 mL of the polymer resin solution and 2 g of SiC powders.

Regarding FIG. 3A, from the electron microscope photograph, it was demonstrated that the particle size of SiC ceramic particles was 25 to 30 µm, and small particles of SiC having a particle size of 1 µm or less were distributed onto large particles. Also, regarding FIG. 3B, it was observed that small particles of SiC were modified into the shape of SiC whisker via a heat-treatment at 1400° C. under argon gas.

Step 20: Coating

The mixed solution prepared in Step 10 was coated on the surfaces of carbon fibers using a brush coating method. The brush coating method has an advantage that a process is very simple and the time necessary to obtain a coating is very short. The mixed solution was coated about 10 times on the surfaces of carbon fibers using the brush coating method.

Steps 30 and 40: First and Second Heat-Treatments

Next, after coating the mixed solution of polyacrylonitrile and SiC on the carbon fibers using a brush, they were dried in air. After the completion of the drying of the solution, the carbon fibers were subjected to a first heat-treatment by heating to 200° C. to 300° C. for 0.5 to 1 hours in air. Then, the carbon fibers were subjected to a second heat-treatment by heating to 1000° C. to 1400° C. for 0.5 to 1 hours under argon gas to coat SiC particles having a uniform size on the carbon fibers at a uniform thickness.

In a SiC coating layer coated on the carbon fibers, spherical SiC particles are dispersed on the surfaces of carbon fibers. The particle size of spherical SiC particles has the average diameter of 300 nm when using the 5 wt % mixed solution of Step 10, or the average diameter of 600 nm when using the 7 wt % mixed solution of Step 10.

A carbon fiber composite coated with SiC was prepared using the above steps.

Result: Analysis of Structures of Carbon Fibers Coated with Ceramic Particles According to the Present Invention Regarding FIG. 4, FIGS. 4A and 4B are high-magnification scanning electron microscope (SEM) photographs of the surface of a carbon fiber composite which is prepared by mixing a PAN resin having 5 wt % concentration and SiC powders at the ratio of 1:1 to form a mixed solution, coating the solution on carbon fibers, being subjected to oxidation stabilization, and being subjected to a heat-treatment at 1400° C. FIGS. 4C and 4D are high-magnification scanning electron microscope (SEM) photographs of the surface of a carbon fiber composite which is prepared by mixing a PAN resin having 7 wt % concentration and SiC powders at the ratio of 1:1 to form a mixed solution, coating the solution on carbon fibers, being subjected to oxidation stabilization, and being subjected to a heat-treatment at 1400° C.

From these photomicrographs, in case of the carbon fiber composite prepared using the PAN resin having 5 wt % concentration, it was demonstrated that SiC particles having a size of 0.1 to 0.3 µm were formed. In case of the carbon fiber composite prepared using the PAN resin having 7 wt % concentration, it was demonstrated that SiC particles having a size of 0.5 to 0.8 μm were formed. When using 7 wt % concentration, particles have relatively large size as compared with 5 wt % concentration, but the uniformity of coating is lowered.

It is considered that this difference is generated because a difference in viscosity of resin solutions having different concentrations affects the dispersibility of coating material. That is, since 5 wt % solution has lower resin concentration than that of 7 wt % solution, 5 wt % solution has lower viscosity and better dispersibility than that of 7 wt % solution.

To the contrary, in case of 7 wt % solution, the uniformity of dispersion of particles is lowered due to relatively high viscosity. From another viewpoint, it may be considered that this difference is generated due to a difference in surface tension between two solutions having different concentrations and particles dispersed. The surface tension between the solution and particles dispersed is relatively large when using 7 wt % solution as compared with 5 wt % solution. Thus, in case of using 5 wt % solution, the particle size of particles formed on fibers after the heat-treatment is relatively small, but the particle size of particles formed on fibers is relatively large when using 7 wt % solution.

Regarding FIG. 5, 002 peak shows definitely at the position of 2=25.92 in the graph of X-ray diffraction analysis of a carbon fiber composite coated with SiC. From the graph, it may be demonstrated that the graphitization of grains constituting fibers was well developed. Also, in case of 101 peak, peaks of 100 and 101 facets at 2=40~42 were not split. Thus, it is predicted that most of the fibers form a turbostratic structure. Since such ceramic particles form an amorphous layer having a low oxygen transmittance rate on the surface of fiber under an oxidation atmosphere at a high temperature, and this layer acts as a protective layer to prevent oxidation, the oxidation of carbon fibers may be inhibited.

FIG. 6 is a graph of thermo-gravimetric analysis (TGA) for a carbon fiber, the carbon fiber composite coated with the mixed solution of 5 wt % PAN resin and SiC at the ratio of 1:1, and the carbon fiber composite coated with the mixed solution of 7 wt % PAN resin and SiC at the ratio of 1:1. The oxidation resistance shows the best value when the weight remains unchanged in this thermo-gravimetric analysis graph. From a result of TGA analysis performed while heating to 1000° C. at the temperature-elevating rate of 10° C./min in air, it was demonstrated that SiC did not show a variation in weight, and thus SiC was a material having good oxidation resistance. To the contrary, the carbon fiber showed a great reduction in weight after heating to 1000° C. In case of the carbon fiber composite coated with ceramics, it was demonstrated that the oxidation resistance of this composite highly increased by 80% or more. Also, the oxidation resistance showed relatively better value when using 5 wt % PAN resin as compared with 7 wt % PAN resin. It is considered that a reason for this is because 5 wt % resin solution has good SiC dispersibility and smaller particle size than that of 7 wt % resin solution, and thus 5 wt % resin solution may be effectively applied on the surface of carbon fiber.

MODE FOR THE INVENTION

Hereinafter, a carbon heater according to an embodiment will be described in detail with reference to the accompanying drawings.

Figure 7:
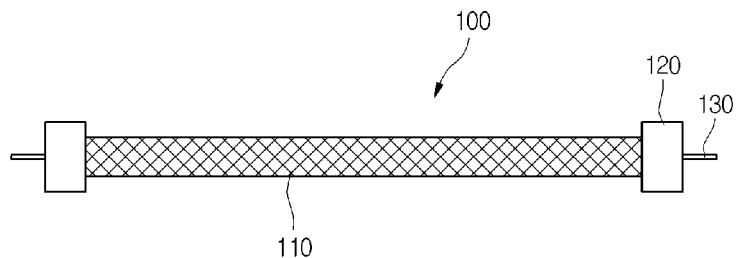
FIG. 7 is a longitudinal cross-sectional view showing a carbon heater according to an embodiment.

FIG. 7 is a longitudinal cross-sectional view showing a carbon heater according to an embodiment.

Regarding FIG. 7, according to the present embodiment, a filament 110 constituting a carbon heater 100 is formed of a carbon or carbon composite coated with an oxidation protective layer. Herein, the oxidation protective layer for a carbon or carbon composite may be coated using the method for coating an oxidation protective layer according to an embodiment.

Also, the filament 110 has support members 120 at each of both ends. The support members 120 may be formed of, for example, a material having desired heat resistance and insulative property.

In addition, both ends of the filament 110 are each connected to terminals 130 of a power supply. The terminals 130 of power supply are substantially passed through the support members 120 and connected to both ends of the filament 110. Power is supplied to the filament 110 through the terminals 130 of power supply.

Contrary to a general carbon heater, the carbon heater according to the present embodiment does not have a tube, because the filament 110 is coated with an oxidation protective layer, and thus it is not necessary to enclose air-tightly the filament 110 within the tube or to fill an inert gas within the tube to prevent the tube from being oxidized.

Figure 8:
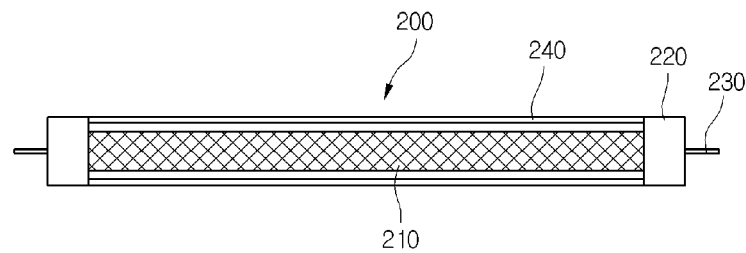
FIG. 8 is a longitudinal cross-sectional view showing a carbon heater according to another embodiment.

FIG. 8 is a longitudinal cross-sectional view showing a carbon heater according to another embodiment.

Regarding FIG. 8, according to the present embodiment, a filament 210 which is formed of a carbon or carbon composite coated with an oxidation protective layer is positioned within a tube 240. The tube 240 has a hollow of which both ends are opened. According to this embodiment, the tube 240 is formed as a bar-like shape having a desired length, but the shape of the tube 240 is not limited to this.

Also, the tube 240 has shielding members 220 at both ends. The shielding members 220 shield both ends of the tube 240. The shielding members 220 may be formed of the same material as that of the support members 220 of the carbon heater according to the previously mentioned embodiment. Herein, the shielding members 220 do not seal the tube 240, but are fixed at both ends of the tube 240 by a press-fit manner, for example.

Both ends of the filament 210 are connected to terminals 230 of a power supply. The terminals 230 of power supply are to supply power to the filament 210, and connected to both ends of the filament 210 through the shielding members 220.

According to the present embodiment, the tube 240 serves to protect the filament 210 or shield the filament 210 from outer environment rather than to enclose the filament 210 in a vacuum or inert gas atmosphere. Therefore, both ends of the tube 240 may be opened, and may be simply shielded by the shielding members 220. This constitution can be achieved by coating the filament 210 with an acid protective layer.

Hereinafter, a cooker according to an embodiment will be described in detail with reference to accompanying drawings.

Figure 9:
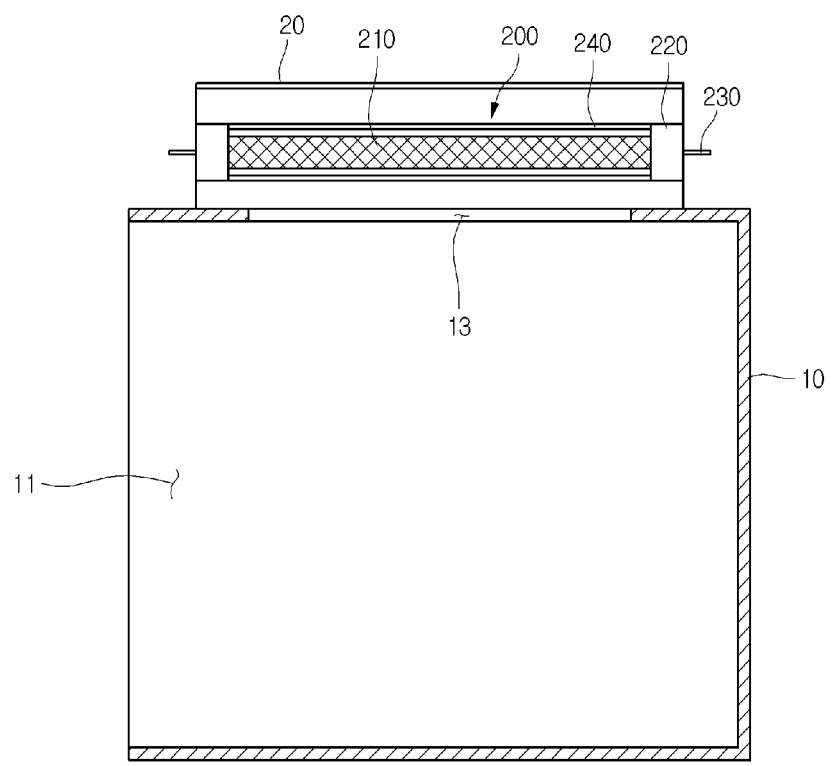
FIG. 9 is a longitudinal cross-sectional view showing a cooker according to an embodiment.

FIG. 9 is a longitudinal cross-sectional view showing a cooker according to another embodiment.

Regarding FIG. 9, a cooking chamber 11 is provided in a cavity 10. Foods are cooked in the cooking chamber 11. The cooking chamber 11 may be selectively opened and closed by a door (not shown).

A transferring opening 12 is formed on the top surface of the cavity 10. The transferring opening 13 is to transfer energy from the heater 200 of the present invention into the cooking chamber 11. The transferring opening 13 is formed by incising a portion of the top surface of the cavity 10.

The carbon heater 200 is installed on the top surface of the cavity 10. The carbon heater 200 is installed on the top surface of the cavity 10 upwardly from the transferring opening 13.

The carbon heater 200 provides energy such as light and heat for cooking foods within the cooking chamber 11. According to this embodiment, the same carbon heater as the carbon heater 200 shown in FIG. 8 is used, but the carbon heater 100 shown in FIG. 7 may be used.

The carbon heater 200 is shielded by a reflector 20. The reflector 20 serves to reflect energy from the carbon heater 200 and transfer it into the cooking chamber 11. Also, the reflector 20 serves to prevent energy from the carbon heater 200 from being leaked outside.

Thus, according to the present embodiment, when the carbon heater 200 is operated, energy generated from the carbon heater 200 is transferred into the cooking chamber 11 through the transferring opening 13. Also, energy from the carbon heater 200 is reflected by the reflector 20 into the cooking chamber 11.

Although embodiments have been primarily described, these embodiments are only to illustrate the present invention, and should not be constructed to limit the scope of the present invention. It is appreciated by a person skilled in the related art that various modifications and variations, for example, of components described in embodiments, are made without departing the scope and spirit of the present invention. Also, it is to be understood that these modifications and variations fall within the scope of the present invention as claimed in the claims.

The invention claimed is:

1. A method for coating an oxidation protective layer for a carbon/carbon composite, comprising:
    dissolving a polymer resin in a solvent to form a solution of polymer resin;
    dispersing ceramic powders in the solution of polymer resin to form a mixed solution;
    coating the mixed solution on a carbon fiber;
    performing a first heat-treatment to treat the carbon fiber by heat in air; and
    performing a second heat-treatment to treat the carbon fiber by heat under an inert gas,
    wherein the polymer resin is dissolved at a ratio of 5 to 10 wt %,
    wherein the ceramic powders are dispersed at a ratio of 1:0.5 to 1:2 by weight with respect to the polymer resin.

2. The method according to claim 1, wherein the polymer resin is selected from the group consisting of polyacrylonitrile, polyimide, polybenzimidazole, and polyvinylalcohol (PVA).

3. The method according to claim 1, wherein the solvent is selected from the group consisting of tetrahydrofuran (THF), dimethylacetamide (DMAc), pyridine, quinoline, and water ($H_2O$).

4. The method according to claim 1, wherein the ceramic material is selected from the group consisting of silicon carbide (SiC), silicon nitride ($Si_3N_4$), and titanium carbide (TiC).

5. The method according to claim 1, wherein in the coating step, the mixed solution is coated on the carbon fiber using a brush or roll coating method.

6. The method according to claim 1, wherein the first heat-treatment is performed at a temperature of 200° C. to 400° C.

7. The method according to claim 1, wherein the inert gas is argon.

8. The method according to claim 1, wherein the second heat-treatment is performed at a temperature of 1000° C. to 1600° C.

9. The method according to claim 1, wherein the first heat-treatment is performed at a lower temperature than that of the second heat-treatment.

10. A carbon heater comprising:
    a filament formed of a carbon or carbon composite coated with an oxidation protective layer; and
    terminals connected to both ends of the filament, which supply power to the filament,
    wherein the filament is coated with the oxidation protective layer by a process comprising:
    dissolving a polymer resin in a solvent to form a solution of polymer resin;
    dispersing ceramic powders in the solution of polymer resin to form a mixed solution;
    coating the mixed solution on a carbon fiber;
    performing a first heat-treatment to treat the carbon fiber by heat in air; and
    performing a second heat-treatment to treat the carbon fiber by heat under an inert gas,
    wherein the polymer resin is dissolved at a ratio of 5 to 10 wt %,
    wherein the ceramic powders are dispersed at a ratio of 1:0.5 to 1:2 by weight with respect to the polymer resin.

11. The carbon heater according to claim 10, further comprising support members provided at both ends of the filament, wherein the terminals are passed through the support members.

12. The carbon heater according to claim 10, further comprising a tube formed as a hollow shape of which both ends are opened, wherein the filament is positioned within the tube; and shielding members for shielding both ends of the tube.

13. The carbon heater according to claim 10, wherein the polymer resin is selected from the group consisting of polyacrylonitrile, polyimide, polybenzimidazole, and polyvinylalcohol (PVA); and wherein the solvent is selected from the group consisting of tetrahydrofuran (THF), dimethylacetamide (DMAc), pyridine, quinoline, and water ($H_2O$).

14. The carbon heater according to claim 10, wherein the ceramic material is selected from the group consisting of silicon carbide (SiC), silicon nitride (Si3N4), and titanium carbide (TiC).

15. The carbon heater according to claim 10, wherein the first heat-treatment is performed at a temperature of 200° C. to 400° C.; and wherein the second heat-treatment is performed at a temperature of 1000° C. to 1600° C. under argon gas.

16. A cooker comprising:
    a cavity having a cooking chamber;
    a carbon heater for supplying energy to cook foods within the cooking chamber;
    a reflector for reflecting energy from the carbon heater into the cooking chamber; and a door to open and close selectively the cooking chamber,
    wherein the carbon heater comprises:
    a filament formed of a carbon or carbon composite coated with an oxidation protective layer; and
    terminals connected to both ends of the filament, which supply power to the filament,
    wherein the filament is coated with the oxidation protective layer by a process comprising dissolving a polymer resin in a solvent to form a solution of polymer resin; dispersing ceramic powders in the solution of polymer resin to form a mixed solution; coating the mixed solution on a carbon fiber; performing a first heat-treatment to treat the carbon fiber by heat in air; and performing a second heat-treatment to treat the carbon fiber by heat under an inert gas, wherein the polymer resin is dissolved at a ratio of 5 to 10 wt %, wherein the ceramic powders are dispersed at a ratio of 1:0.5 to 1:2 by weight with respect to the polymer resin.

* * * * *